United States Patent
Hernandez

(10) Patent No.: US 12,081,106 B2
(45) Date of Patent: Sep. 3, 2024

(54) BEARING CAP HEAT SINK SYSTEM FOR AN ELECTRIC MOTOR

(71) Applicant: Toshiba International Corporation, Houston, TX (US)

(72) Inventor: Sergio Hernandez, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 18/354,893

(22) Filed: Jul. 19, 2023

(65) Prior Publication Data

US 2023/0369943 A1 Nov. 16, 2023

Related U.S. Application Data

(63) Continuation of application No. 17/394,957, filed on Aug. 5, 2021, now Pat. No. 11,750,066.

(51) Int. Cl.
*H02K 9/10* (2006.01)
*H02K 5/04* (2006.01)
*H02K 7/00* (2006.01)

(52) U.S. Cl.
CPC .............. *H02K 9/10* (2013.01); *H02K 5/04* (2013.01); *H02K 7/003* (2013.01)

(58) Field of Classification Search
CPC .. H02K 9/00; H02K 9/06; H02K 9/10; H02K 9/19
USPC ...................................... 310/58, 60 R, 62–64
See application file for complete search history.

(56) References Cited

U.S. PATENT DOCUMENTS

| | | | | |
|---|---|---|---|---|
| 2,394,517 A | * | 2/1946 | Ingalls ..................... | H02K 9/18 310/60 R |
| 4,814,653 A | * | 3/1989 | Hasegawa ............... | F16C 37/00 310/90 |
| 2013/0175892 A1 | | 7/2013 | Klaus et al. | |

FOREIGN PATENT DOCUMENTS

| | | |
|---|---|---|
| CN | 108199533 A | 6/2018 |
| CN | 211908573 U | 11/2020 |
| KR | 102222129 B1 * | 3/2021 |

* cited by examiner

*Primary Examiner* — Jose A Gonzalez Quinones
(74) *Attorney, Agent, or Firm* — Baker Botts L.L.P.

(57) ABSTRACT

The present disclosure provides for an electric motor that comprises a housing and a shaft disposed through the housing. The electric motor further comprises a rotor fitted on the shaft within the housing and a stator disposed within the housing and around the rotor. The electric motor further comprises a fan covering disposed on a first end of the housing and a first bearing cap disposed at the first end of the housing, wherein the first bearing cap is configured to house a first bearing, wherein the first bearing cap comprises a plurality of protrusions configured to operate as a heat sink for the electric motor. The electric motor further comprises a first fan disposed at an end of the shaft and within the fan covering, wherein the first fan is operable to generate a first airflow configured to flow over an external surface of the housing.

20 Claims, 5 Drawing Sheets

BEARING CAP HEAT SINK SYSTEM FOR AN ELECTRIC MOTOR

CROSS REFERENCE TO RELATED APPLICATION

This application is a continuation application of U.S. application Ser. No. 17/394,957, filed on Aug. 5, 2021, entitled "BEARING CAP HEAT SINK SYSTEM FOR AN ELECTRIC MOTOR", which is incorporated herein by reference in its entirety.

TECHNICAL FIELD

The present invention relates to the assembly and operation of electric motors. More particularly, the invention relates to a bearing cap heat sink system for an electric motor.

BACKGROUND

In existing electric motors that are subjected to high speeds and/or that support high thrust loads, the motor bearings can be subjected to extreme conditions. For example, in certain electric motors, the motors contain a bearing that is subjected to wear and heat. In order to address this difficulty, manufacturers have developed external cooling systems that seek to reduce heat generated within the bearing. However, these external cooling systems often generate airflow that is directed to cool the exterior of the electric motor, and the generated airflow is not able to remove heat from a bearing located inside the electric motor.

SUMMARY

In an embodiment, an electric motor comprises a housing and a shaft disposed through the housing. The electric motor further comprises a rotor fitted on the shaft within the housing and a stator disposed within the housing and around the rotor. The electric motor further comprises a fan covering disposed on a first end of the housing and a first bearing cap disposed at the first end of the housing, wherein the first bearing cap is configured to house a first bearing, wherein the first bearing cap comprises a plurality of protrusions configured to operate as a heat sink for the electric motor. The electric motor further comprises a first fan disposed at an end of the shaft and within the fan covering, wherein the first fan is operable to generate a first airflow configured to flow over an external surface of the housing.

In another embodiment, a method of operating an electric motor comprises rotating a rotor coupled to a shaft disposed within a housing. The method further comprises generating a first airflow with a first fan disposed within a fan covering, wherein the fan covering is disposed at a first end of the housing, wherein a first bearing cap is disposed at the first end of the housing, wherein the first bearing cap comprises a plurality of protrusions configured to operate as a heat sink for the electric motor. The method further comprises directing the first airflow to flow out of the fan covering and over an external surface of the housing and producing a torque based on the rotation of the rotor.

BRIEF DESCRIPTION OF THE DRAWINGS

For a more complete understanding of the present disclosure and its features and advantages, reference is made to the following description, taken in conjunction with the accompanying drawings, in which.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments described below with respect to one implementation are not intended to be limiting.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

Figure 1:
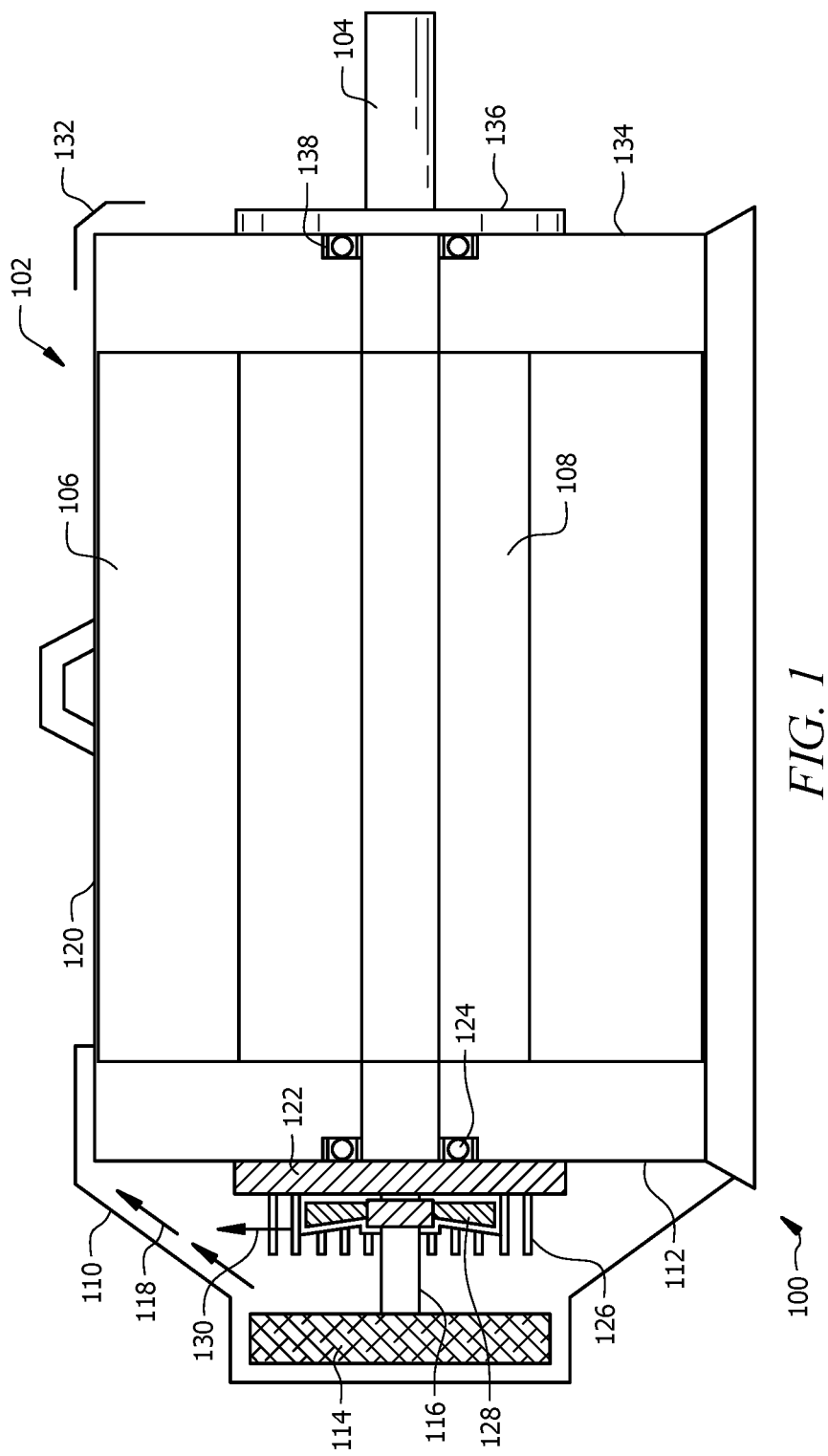
FIG. 1 is a diagram illustrating an example electric motor, according to aspects of the present disclosure.

The present disclosure provides for systems and methods for cooling an electric motor. With reference now to the figures, FIG. 1 illustrates an example electric motor 100. It should be understood that the electric motor 100 may comprise any known electric motor technology and may include, e.g., DC motors (for example, a shunt DC motor where rotor and stator windings are connected in parallel, separately excited motors where the rotor and stator are connected from different power supplies, series motors, where the stator and rotor are connected in series, permanent magnet motors in which the stator is a permanent magnet, compound motors, and the like), AC motors (for example, induction motor, synchronous motor, and the like), brushless DC motors, and/or various other electric motors. As illustrated, the electric motor 100 may comprise a housing 102, a shaft 104, a stator 106, a rotor 108, and a fan covering 110. The housing 102 may be any suitable size, height, shape, and combinations thereof. In embodiments, the housing 102 may comprise any suitable materials, including, but not limited to, metals, nonmetals, polymers, ceramics, composites, and any combinations thereof. The housing 102 may be configured to contain most of the components of the electric motor 100 and to protect those components from an external environment. The shaft 104 may be disposed through the housing 102. In embodiments, the shaft 104 may be configured to rotate within the housing 102. As shown, stator 106 may be disposed within the housing 102 around the shaft 104. The rotor 108 may be fixed to the shaft 104 and disposed concentric to the stator 106. During operations, a magnetic field may be generated between the stator 106 and the rotor 108 and may induce the rotor 108 to rotate. As the rotor 108 is fixed to the shaft 104, the shaft 104 may rotate in conjunction with the rotor 108, thereby producing a torque.

As illustrated, the fan covering 110 may be disposed at least partially over a first end 112 of the housing 102. The fan covering 110 may be coupled to the housing 102 through any suitable means, including, but not limited to, fasteners, adhesives, welding, brazing, threading, and the like. As shown, there may be a first fan 114 located within the fan covering 110 and disposed at an end 116 of the shaft 104. The first fan 114 may be operable to generate a first airflow 118, and the fan covering 110 may be configured to direct the first airflow 118 to flow over an external surface 120 of the housing 102.

The electric motor 100 may further comprise a first bearing cap 122 operable to secure a first bearing 124 to the shaft 104. The first bearing cap 122 may be disposed at the first end 112 of the housing 102. The first bearing cap 122 may comprise a plurality of protrusions 126 configured to operate as a heat sink for the first bearing 124 of the electric motor 100. The plurality of protrusions 126 may be any suitable size, height, shape, and combinations thereof. In embodiments, the plurality of protrusions 126 may comprise any suitable materials, including, but not limited to, metals, nonmetals, polymers, ceramics, composites, and any combinations thereof. In one or more embodiments, each of the plurality of protrusions 126 may be coupled to the first bearing cap 122 or may be integrated into the first bearing cap 122. Without limitations, the plurality of protrusions 126 may be threadably coupled to the first bearing cap 122 or coupled to the first bearing cap 122 through casting. In certain embodiments, each of the plurality of protrusions 126 may comprise uniform dimensions relative to each other. In other embodiments, each of the plurality of protrusions 126 may comprise different dimensions from each other. The plurality of protrusions 126 may further be arranged on the first bearing cap 122 in any suitable manner, such as uniformly along the first bearing cap 122, in a pattern, or randomly. As illustrated, the plurality of protrusions 126 may extend from the first bearing cap 122 to the first fan 114.

During operations, the temperature of the first bearing 124 may increase. As described, the plurality of protrusions 126 may be configured to function as a heat sink for the first bearing 124 and to remove heat from the first bearing 124. In embodiments, the first airflow 118 generated by the first fan 114 may not be configured to cool the plurality of protrusions 126 efficiently. As illustrated, a second fan 128 may be coupled to the shaft 104 and located within the fan covering 110. The second fan 128 may be disposed between the first fan 114 and the first bearing cap 122 and adjacent to the first bearing cap 122, wherein the plurality of protrusions 126 may be disposed around the second fan 128. The second fan 128 is operable to generate a second airflow 130 configured to flow over the plurality of protrusions 126. As the second airflow 130 flows over the plurality of protrusions 126, the temperature of the plurality of protrusions 126 may decrease, and the capacity to remove heat from the first bearing 124 may increase due to the reduction in temperature.

The first airflow 118 and the second airflow 130 may exit the fan covering 110 and flow over the external surface 120 of the housing 102. The electric motor 100 may further comprise an airflow deflector 132. The airflow deflector 132 may be disposed at a second end 134 of the housing 102, wherein the airflow deflector 132 may be operable to direct at least a portion of the first airflow 118 and/or second airflow 130 to flow over a second bearing cap 136 disposed at the second end 134 of the housing 102 and operable to secure a second bearing 138 to the shaft 104.

Figure 2:
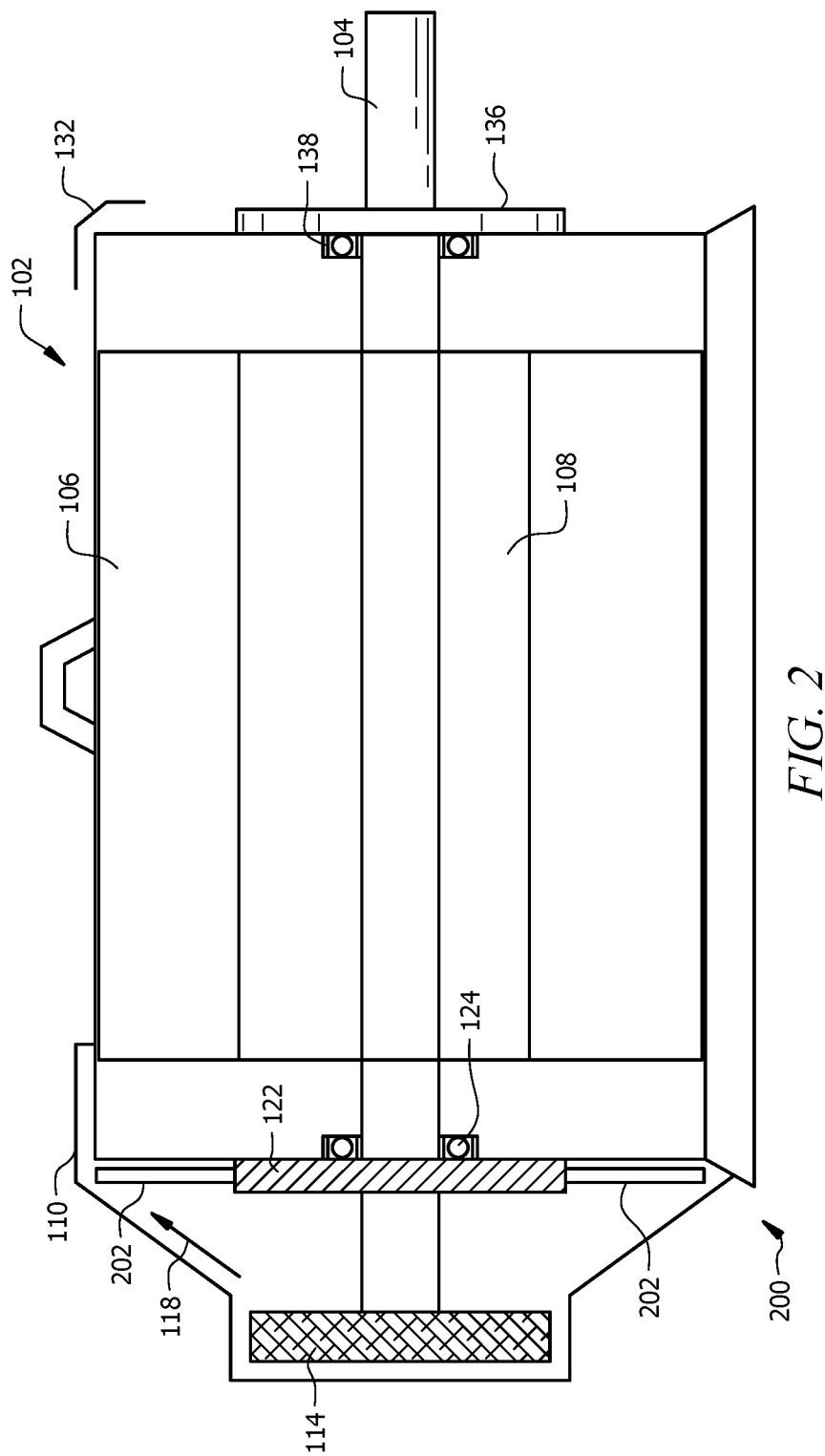
FIG. 2 is a diagram illustrating an example electric motor, according to aspects of the present disclosure.

FIG. 2 illustrates an example electric motor 200. In embodiments, electric motor 200 may operate similar to and comprise similar components as the electric motor 100 (referring to FIG. 1). As seen in FIG. 2, the electric motor 200 may comprise the housing 102, the shaft 104, the stator 106, the rotor 108, the fan covering 110, the first fan 114, the first bearing cap 122, the first bearing 124, the airflow deflector 132, the second bearing cap 136, and the second bearing 138. As previously described, the shaft 104 may be configured to rotate within the housing 102. The rotor 108 may be fixed to the shaft 104 and disposed concentric to the stator 106. During operations, a magnetic field may be generated between the stator 106 and the rotor 108 and may induce the rotor 108 to rotate. As the rotor 108 is fixed to the shaft 104, the shaft 104 may rotate in conjunction with the rotor 108, thereby producing a torque. The first fan 114 may generate the first airflow 118, and the fan covering 110 may direct the first airflow 118 to flow over the housing 102. The airflow deflector 132 may direct at least a portion of the first airflow 118 to flow over the second bearing cap 136 to cool the second bearing 138.

In the illustrated embodiment, the electric motor 200 may further comprise a plurality of protrusions 202 disposed circumferentially around the first bearing cap 122. The plurality of protrusions 202 may extend radially from the first bearing cap 122 to the fan covering 110. The plurality of protrusions 202 may be disposed within a flow path of the generated first airflow 118. With reference to the electric motor 100 of FIG. 1, the first airflow 118 may not have been directed to flow over the plurality of protrusions 126. The electric motor 100 may be operable to reduce the temperature of that plurality of protrusions 126 with the second fan 128. Referring back to the electric motor 200 of FIG. 2, the first airflow 118 may be configured to flow over the plurality of protrusions 202 prior to exiting the fan covering 110. The flow of the first airflow 118 over the plurality of protrusions 202 may reduce the temperature of the plurality of protrusions 202 and may increase the capacity for heat removal from the first bearing 124.

Figure 3A:
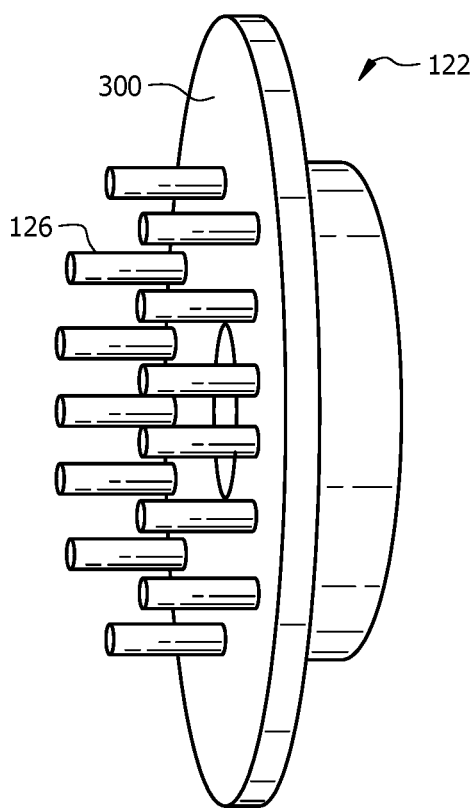
FIGS. 3A and 3B illustrate an example bearing cap, according to aspects of the present disclosure.
Figure 3B:
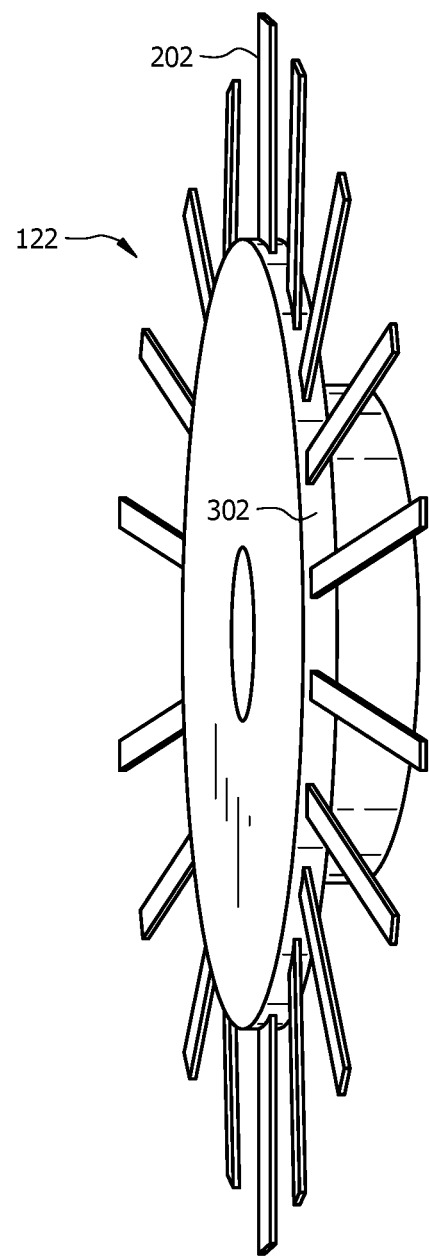

FIGS. 3A and 3B each illustrate an example first bearing cap 122. FIG. 3A illustrates an embodiment of the first bearing cap 122 used by the electric motor 100 (referring to FIG. 1), and FIG. 3B illustrates an embodiment of the first bearing cap 122 used by the electric motor 200 (referring to FIG. 2). As shown in FIG. 3A, the plurality of protrusions 126 may extend from an outer surface 300 of the first bearing cap 122. The plurality of protrusions 126 may generally be arranged in a circular pattern to accommodate the second fan 128 (referring to FIG. 1). In certain embodiments, a length of the plurality of protrusions 126 may be greater than a width of the second fan 128, wherein the second fan 128 may be disposed adjacent to the outer surface 300. With reference now to FIG. 3B, the plurality of protrusions 202 may be disposed about a circumferential surface 302 of the first bearing cap 122. Each of the plurality of protrusions 202 may extend in a radial direction away from the circumferential surface 302 and towards the fan covering 110 (referring to FIG. 1). In one or more embodiments, the plurality of protrusions 202 may comprise at least one dimension that is greater than that of the plurality of protrusions 126 (for example, length).

Figure 4:
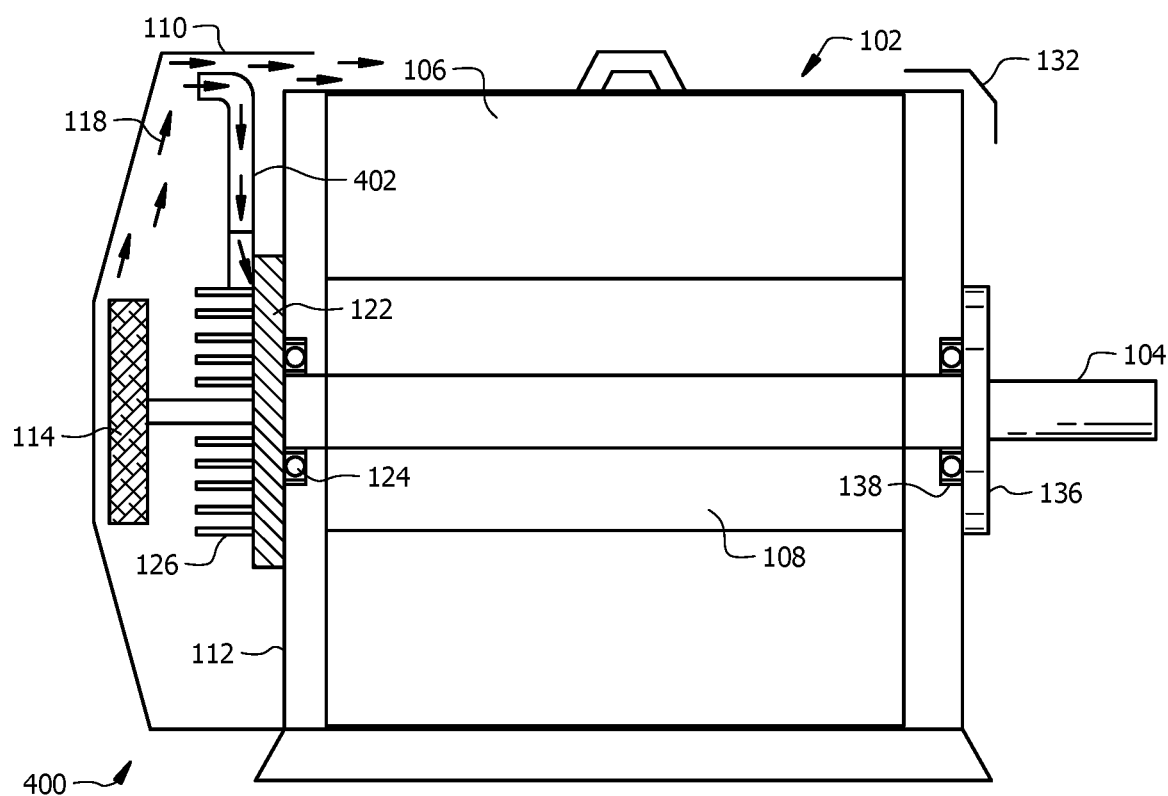
FIG. 4 is a diagram illustrating an example electric motor, according to aspects of the present disclosure.

FIG. 4 illustrates an example electric motor 400. In embodiments, electric motor 400 may operate similar to and comprise similar components as the electric motor 100 (referring to FIG. 1). As seen in FIG. 4, the electric motor 400 may comprise the housing 102, the shaft 104, the stator 106, the rotor 108, the fan covering 110, the first fan 114, the first bearing cap 122, the first bearing 124, the plurality of protrusions 126, the airflow deflector 132, the second bearing cap 136, and the second bearing 138. As previously described, the shaft 104 may be configured to rotate within the housing 102. The rotor 108 may be fixed to the shaft 104 and disposed concentric to the stator 106. During operations, a magnetic field may be generated between the stator 106 and the rotor 108 and may induce the rotor 108 to rotate. As the rotor 108 is fixed to the shaft 104, the shaft 104 may rotate in conjunction with the rotor 108, thereby producing a torque. The first fan 114 may generate the first airflow 118, and the fan covering 110 may direct the first airflow 118 to flow over the housing 102. The airflow deflector 132 may direct at least a portion of the first airflow 118 to flow over the second bearing cap 136 to cool the second bearing 138.

In the illustrated embodiment, the electric motor 400 may comprise the plurality of protrusions 126 disposed on the first bearing cap 122 and extending to the first fan 114. As illustrated, the first airflow 118 may not be directed to flow over the plurality of protrusions 126. The electric motor 400 may further comprise an intake manifold 402 operable to receive at least a portion of the first airflow 118 and to direct the portion of the first airflow 118 to flow over the plurality of protrusions 126. The intake manifold 402 may be any suitable size, height, shape, and combinations thereof. The intake manifold 402 may be at least partially enclosed in order to provide a flow path for the first airflow 118. In embodiments, the intake manifold 402 may comprise any suitable materials, including, but not limited to, metals, nonmetals, polymers, ceramics, composites, and any combinations thereof. The intake manifold 402 may be coupled to the first end 112 of the housing through any suitable means, including, but not limited to, fasteners, brackets, adhesives, welding, brazing, threading, and the like. As the portion of the first airflow 118 exits the intake manifold to flow over the plurality of protrusions 126, there may be a reduction in the temperature of the plurality of protrusions 126. There may further be an increase in the capacity for heat removal from the first bearing 124 by the plurality of protrusions 126.

Figure 5A:
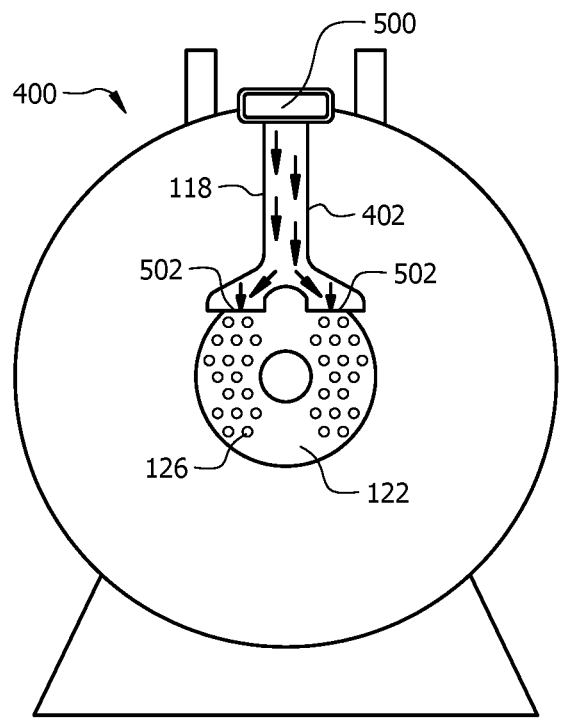
FIGS. 5A and 5B illustrate an example outer surface of an electric motor, according to aspects of the present disclosure.
Figure 5B:
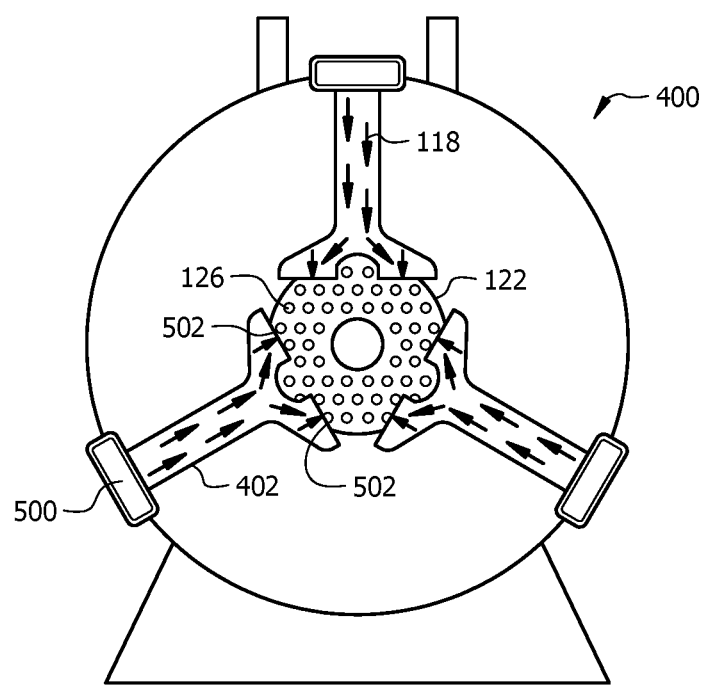

FIG. 5A illustrates an embodiment of the intake manifold 402 used by the electric motor 400, and FIG. 5B illustrates an embodiment of a plurality of intake manifolds 402 used by the electric motor 400. With reference to both FIGS. 5A and 5B, each intake manifold 402 may comprise an inlet 500 and one or more outlets 502. The inlet 500 may be any suitable size, height, shape, and combinations thereof, to effectively receive the first airflow. The one or more outlets 502 may be any suitable size, height, shape, and combinations thereof, to effectively discharge the first airflow 118. The inlet 500 may be disposed parallel to the outer surface 300 (referring to FIG. 3A) of the first bearing cap 122 and configured to receive the first airflow 118 from the first fan 114 (referring to FIG. 4). The one or more outlets 502 may be disposed perpendicular to the outer surface 300 of the first bearing cap 122 and configured to direct the first airflow 118 over the plurality of protrusions 126. As the inlet 500 receives the first airflow 118, the first airflow 118 may flow along a flow path defined within the intake manifold 402 and be discharged through and over the plurality of protrusions 126.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. An electric motor comprising:
a housing;
a shaft disposed through the housing;
a fan covering disposed on a first end of the housing;
a first bearing cap disposed at the first end of the housing, wherein the first bearing cap is configured to house a first bearing, wherein the first bearing cap comprises a plurality of protrusions configured to operate as a heat sink for the electric motor; and
a first fan disposed at an end of the shaft and within the fan covering, wherein the first fan is operable to generate a first airflow configured to flow over an external surface of the housing, wherein the plurality of protrusions are disposed on a circumferential surface of the first bearing cap and extend radially from the circumferential surface, wherein at least a portion of the plurality of protrusions extend horizontally with reference to the first bearing cap, wherein the first airflow is configured to flow over at least a portion of the plurality of protrusions prior to exiting the fan covering to flow over the external surface of the housing.

2. The electric motor of claim 1, further comprising an airflow deflector disposed at a second end of the housing, wherein the airflow deflector is operable to direct at least a portion of the first airflow to flow over a second bearing cap disposed at the second end of the housing.

3. The electric motor of claim 1, wherein each one of the plurality of protrusions comprises uniform dimensions.

4. The electric motor of claim 1, wherein each one of the plurality of protrusions are threadably coupled to the first bearing cap.

5. The electric motor of claim 1, wherein each one of the plurality of protrusions is coupled to the first bearing cap through casting.

6. The electric motor of claim 1, further comprising a second bearing cap disposed at a second end of the housing opposite to the first end, wherein the second bearing cap is configured to house a second bearing.

7. The electric motor of claim 1, further comprising a rotor fitted on the shaft within the housing and configured to rotate with the shaft.

8. The electric motor of claim 7, further comprising a stator disposed within the housing and around the rotor.

9. A method of operating an electric motor, comprising:
  rotating a rotor coupled to a shaft disposed within a housing;
  generating a first airflow with a first fan disposed within a fan covering, wherein the fan covering is disposed at a first end of the housing, wherein a first bearing cap is disposed at the first end of the housing, wherein the first bearing cap comprises a plurality of protrusions configured to operate as a heat sink for the electric motor, wherein the plurality of protrusions are disposed on a circumferential surface of the first bearing cap and extend radially from the circumferential surface, wherein at least a portion of the plurality of protrusions extend horizontally with reference to the first bearing cap;
  directing the first airflow to flow out of the fan covering and over an external surface of the housing;
  directing the first airflow to flow over the plurality of protrusions prior to exiting the fan covering to flow over the external surface of the housing; and
  producing a torque based on the rotation of the rotor.

10. The method of claim 9, further comprising directing at least a portion of the first airflow to flow over a second bearing cap disposed at a second end of the housing with an airflow deflector.

11. The method of claim 9, wherein each one of the plurality of protrusions are threadably coupled to the first bearing cap or coupled to the first bearing cap through casting.

12. The method of claim 9, further comprising generating a magnetic field between the rotor and an associated stator to induce rotation of the rotor.

13. An electric motor comprising:
  a housing;
  a shaft disposed through the housing;
  a fan covering disposed on a first end of the housing;
  a first bearing cap disposed at the first end of the housing, wherein the first bearing cap is configured to house a first bearing, wherein the first bearing cap comprises a plurality of protrusions configured to operate as a heat sink for the electric motor;
  a first fan disposed at an end of the shaft and within the fan covering, wherein the first fan is operable to generate a first airflow configured to flow over an external surface of the housing, wherein the plurality of protrusions are disposed on an outer surface of the first bearing cap and extend axially away from the outer surface towards the first fan; and
  an intake manifold coupled to the outer surface of the first bearing cap, wherein the intake manifold comprises an inlet and one or more outlets.

14. The electric motor of claim 13, further comprising an airflow deflector disposed at a second end of the housing, wherein the airflow deflector is operable to direct at least a portion of the first airflow to flow over a second bearing cap disposed at the second end of the housing.

15. The electric motor of claim 13, wherein each one of the plurality of protrusions are threadably coupled to the first bearing cap or coupled to the first bearing cap through casting.

16. The electric motor of claim 13, further comprising a second bearing cap disposed at a second end of the housing opposite to the first end, wherein the second bearing cap is configured to house a second bearing.

17. The electric motor of claim 13, further comprising a rotor fitted on the shaft within the housing and configured to rotate with the shaft.

18. The electric motor of claim 17, further comprising a stator disposed within the housing and around the rotor.

19. The electric motor of claim 13, wherein the inlet is disposed parallel to the outer surface of the first bearing cap and configured to receive the first airflow from the first fan, wherein the one or more outlets are disposed perpendicular to the outer surface of the first bearing cap and configured to direct the first airflow over the plurality of protrusions.

20. The electric motor of claim 13, further comprising a plurality of intake manifolds coupled to the outer surface of the first bearing cap, wherein each one of the plurality of intake manifolds comprises an inlet and one or more outlets.

* * * * *